(12) United States Patent
Welz, Jr. et al.

(10) Patent No.: US 6,279,870 B1
(45) Date of Patent: Aug. 28, 2001

(54) INTELLIGENT VALVE ACTUATOR

(75) Inventors: Albert W. Welz, Jr.; Brenda J. Marchetti; John D. Parker, all of Westford, MA (US)

(73) Assignee: Maxon Corporation, Muncie, IN (US)

( * ) Notice: Subject to any disclaimer, the term of this patent is extended or adjusted under 35 U.S.C. 154(b) by 0 days.

(21) Appl. No.: 09/646,269

(22) PCT Filed: Mar. 26, 1999

(86) PCT No.: PCT/US99/06463

§ 371 Date: Sep. 15, 2000

§ 102(e) Date: Sep. 15, 2000

(87) PCT Pub. No.: WO99/50580

PCT Pub. Date: Oct. 7, 1999

Related U.S. Application Data
(60) Provisional application No. 60/079,566, filed on Mar. 27, 1998.

(51) Int. Cl.[7] .................................................. F16K 31/02
(52) U.S. Cl. ................................ 251/129.04; 251/129.12; 431/12; 431/18
(58) Field of Search ........................... 251/129.04, 129.11, 251/129.12; 431/12, 18; 137/554

(56) References Cited

U.S. PATENT DOCUMENTS

| | | |
|---|---|---|
| 4,469,127 | 9/1984 | Kitamura . |
| 4,926,903 | 5/1990 | Kawai . |
| 5,076,321 | 12/1991 | Terry . |
| 5,154,206 | 10/1992 | Gillott et al. . |
| 5,609,184 | 3/1997 | Apel et al. . |
| 5,802,859 | 9/1998 | Zugibe . |
| 5,983,164 | 11/1999 | Ocondi . |

Primary Examiner—John Rivell
(74) Attorney, Agent, or Firm—Barnes & Thornburg

(57) ABSTRACT

The burner system (17) includes a burner (28), an air/fuel supply, and a burner control (12) that includes a pair of valve assemblies (13,14) with a flow control (18) and two valve actuators (10,11). A position encoder (108) is rigidly connected to the flow control member (18) and generates valve position signals. Control modules (112 are programmed to drive and store calibration parameters specific to the position encoder (108). During operation, the control modules command positioning of the flow control member (18) and compare the position signals to the stored positions to determine correct valve position.

34 Claims, 7 Drawing Sheets

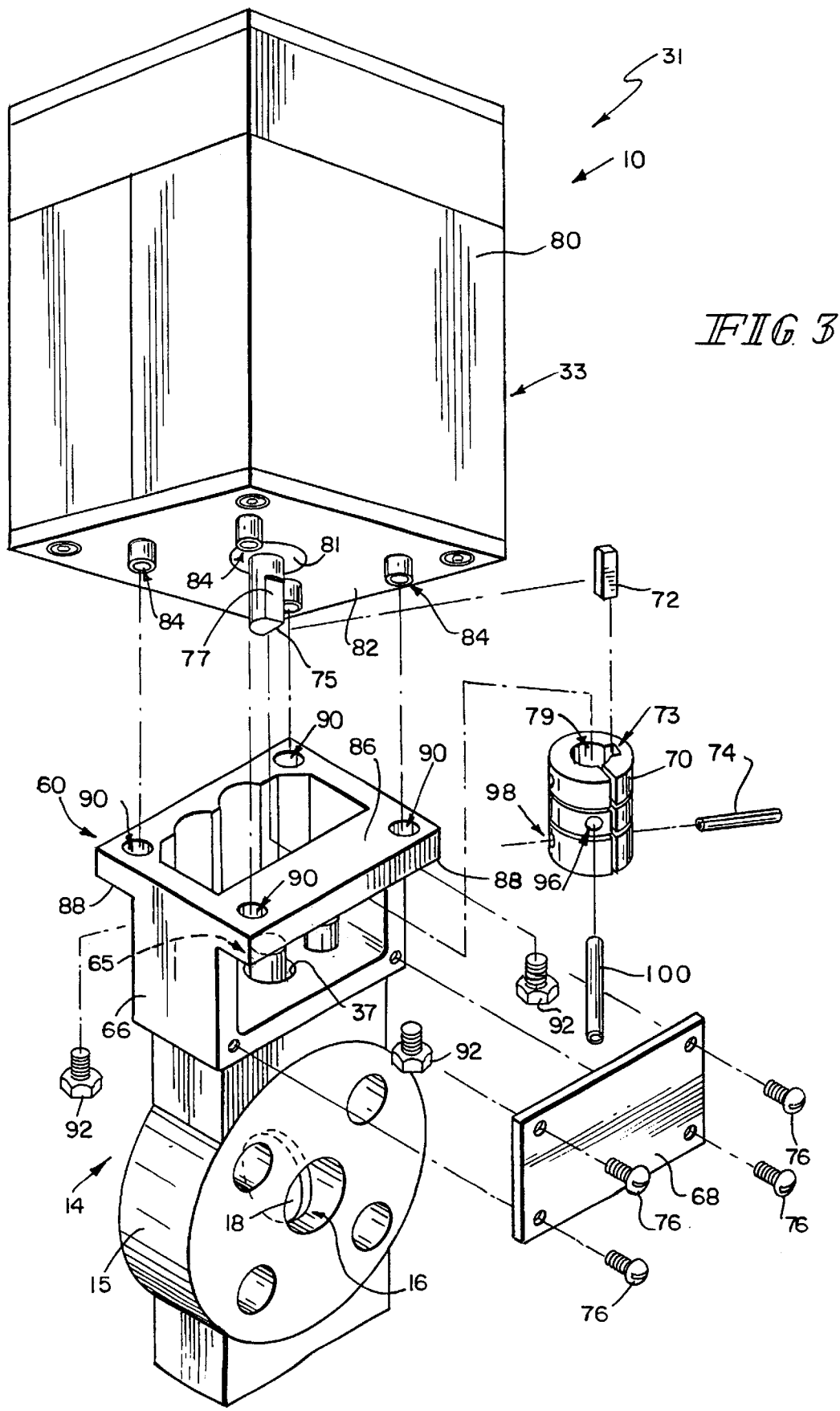

INTELLIGENT VALVE ACTUATOR

This application claims priority to U.S. Provisional Patent Application No. 60/079,566, filed Mar. 27, 1998, which is expressly incorporated by reference herein.

BACKGROUND AND SUMMARY OF THE INVENTION

The present invention relates to a valve actuator for controlling the position of a flow-control valve positioned within a passageway to regulate fluid flow through the passageway, and particularly to valve actuators for achieving highly precise regulation of fluid flow. More particularly, the present invention relates to high precision electromechanical actuators for control of fluid flow through a valve of the type used to regulate air or fuel flow into a combustion chamber in an industrial burner.

Combustible air and fuel mixtures are typically burned in industrial burners to produce heat of the type often needed in industrial applications. Burner control systems typically regulate the flow of air and fuel to a burner using flow-control valves provided in the air and fuel supply pipes that are arranged to supply air (or oxygen) and fuel to the burner.

Industrial burner applications impose a variety of performance requirements on a valve actuation system included in a burner control system. For example, certain industrial heating processes require highly precise control of the air and fuel flows, which dictates that a valve actuator used in a burner control system must be able to position the flow-control valve very accurately to regulate fluid flow past the valve. Furthermore, the ability to regulate fluid flow precisely can be complicated by changing environmental parameters, such as fluctuations in the pressure and temperature of the air and fuel supplies.

In practice, operators of industrial burner systems often need to maintain or upgrade the performance of the burner system. This can be accomplished by repairing or replacing either the entire burner control system or only a portion of the control system, such as a valve actuator component.

According to the present invention, a valve actuator assembly is provided for positioning a flow-control valve member positioned to lie in a flow path of a fluid supply system. The valve actuator assembly includes a housing, a driver coupled to the housing, and a controller. The driver the includes a motor and a shaft connected to the motor and configured to move the flow-control valve member from an actual valve position to a desired valve position to regulate the flow of fluid through the flow path. The controller is coupled to the motor and configured to command the motor to position the flow-control valve member in the desired valve position. The controller includes a control module and a sensor. The control module is programmed to receive a position command and to instruct the motor to move the valve to the desired valve position based on the position command.

The sensor is coupled to the control module and the shaft to indicate the actual valve position of the flow-control valve member using a valve position signal generated by the sensor and sent to the control module. The control module is programmed to receive and compare the valve position signal received from the sensor to calibration parameters to determine whether the valve is in the desired valve position and, if necessary, to instruct the motor to reposition the flow-control valve member in the desired valve position.

In preferred embodiments, the control module is configured to store sensor specific calibration parameters and to instruct the motor to move the flow-control valve member to the desired valve position. The control module is programmed to compare the valve position signal from the sensor to the sensor specific calibration parameters to determine whether the valve is in the desired valve position and, if necessary, to instruct the motor to reposition the flow-control valve member in the desired position.

The controller includes a network interface coupled to the control module and configured to communicate with a communications network. The control module is programmed to receive position commands through the network interface from the communications network to instruct the driver to move the flow-control valve member to the desired valve position.

A method is provided for calibrating the valve actuator assembly. The method includes the step of providing a valve actuator assembly having a driver connected to a flow-control valve member and a controller coupled to the driver. The controller includes a control module coupled to the driver and a sensor coupled to the control module. The control module is configured to command the driver to move the flow-control valve member to a desired valve position. The sensor is configured to indicate an actual valve position using a valve position signal indicative of the actual valve position. The method further includes the steps of generating calibration parameters specific to the sensor, commanding the driver to move the flow-control valve member to a desired valve position, generating a valve position signal, comparing the valve position signal with the calibration parameters to determine the need to reposition the valve, and commanding the driver to reposition the flow-control valve member to the desired valve position.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is a partially exploded perspective view of one of the valve actuator assemblies and one of the valve assemblies coupled to the valve actuator assembly showing the valve actuator assembly including a valve actuator and a coupling coupled to the valve assembly, the valve actuator including a box-shaped actuator housing and an actuator output shaft extending from the actuator housing, the coupling including a coupling housing coupled to the valve assembly, an access panel removed from the coupling housing, and a cylindrical connector removed from within the coupling housing, and the valve assembly including a valve housing coupled to the underside of the coupling housing and a valve shaft coupled to the flow-control valve member and extending from within the valve housing into the coupling housing;

FIG. 10 is a partially sectional view of the flow-control valve member in the 0° or closed position;

FIG. 11 is an end view of the stationary plate and rotating wiper of FIG. 8 showing the wiper contacting a curved resistive element in a position corresponding to the position of the flow-control valve member as shown in FIG. 10;

FIG. 12 is a partially sectional view of the flow-control valve member in the 45° or partially opened position;

FIG. 13 is an end view of the stationary plate and rotating wiper of FIG. 8 showing the wiper contacting the curved resistive element in a position corresponding to the position of the flow-control valve member as shown in FIG. 12;

FIG. 14 is a partially sectional view of the flow-control valve member in the 90° or fully opened position; and FIG. 15 is an end view of the stationary plate and rotating wiper of FIG. 8 showing the wiper contacting the curved resistive element in a position corresponding to the position of the flow-control valve member as shown in FIG. 14.

DETAILED DESCRIPTION OF THE DRAWINGS

Figure 1:
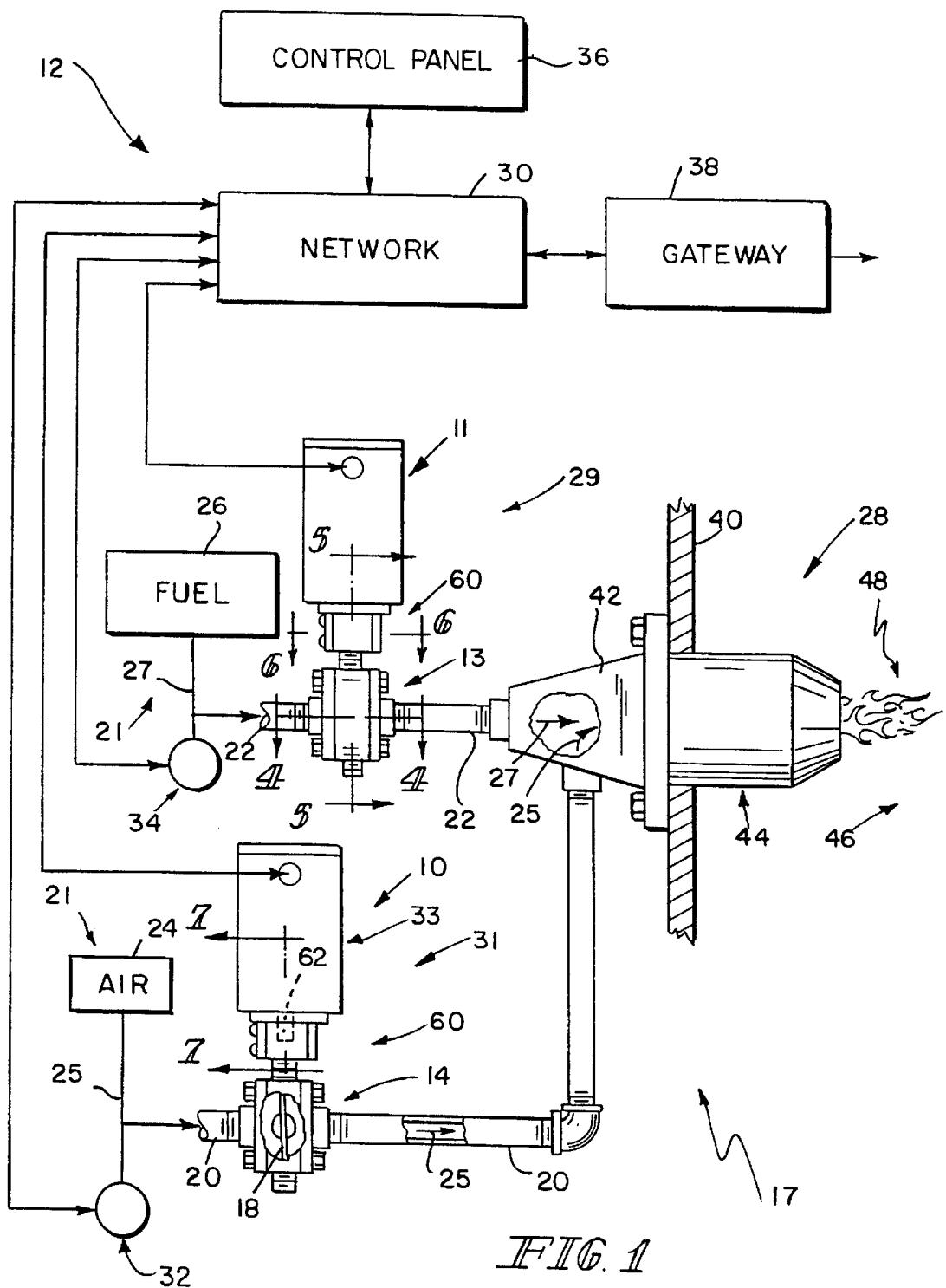
FIG. 1 is diagrammatic view of a burner system in accordance with the present invention showing the burner system including an industrial burner producing a flame, an air/fuel supply system including air and fuel supplies connected to the industrial burner, and a burner control system coupled to the air and fuel supplies to regulate the flow of air and fuel therethrough, the burner control system including a pair of flow-control valves coupled to respective air and fuel supplies and including a pair of valve assemblies and a pair of valve actuator assemblies in accordance with the present invention coupled to respective valve assemblies, and an electronic communication network coupling the valve actuator assemblies with a control panel and a network gateway.

A burner system 17 includes a flame-producing industrial burner 28, an air/fuel supply system 21 coupled to industrial burner 28, and a burner control system 12 coupled to air/fuel supply system 21, as shown in FIG. 1, to regulate the flow of air and fuel to industrial burner 28. Burner control system 12 includes a pair of flow controllers 32, 34 coupled to air/fuel supply system 21 to monitor physical qualities of the air and fuel and a pair of flow-control valves 29, 31 also coupled to air/fuel supply system 21 to regulate the flow of air and fuel through air/fuel supply system 21.

Flow-control valves 29, 31 include valve assemblies 13, 14 and valve actuator assemblies 10, 11 coupled to respective valve assemblies 13, 14 and flow controllers 32, 34 for communication therebetween. Flow controllers 32, 34 and flow-control valves 29, 31 cooperate to achieve highly precise regulation of the flow of air and fuel through air/fuel supply system 21 to a burner 28 to achieve a desired burner output.

Valve actuator assemblies 10, 11 position valve assemblies 13, 14 to desired valve position according to valve position commands received from flow controllers 32, 34. To verify that the actual valve position matches the desired valve position, valve actuator assemblies 10, 11 perform a closed loop verification of the actual valve position and compare the actual valve position with the desired valve position. If the actual position does not match the desired position, valve actuator assemblies 10, 11 reposition flow control valve 13, 14 to the desired position. During a calibration setup procedure, each valve actuator assembly 10, 11 is programmed to include calibration parameters specific to each valve actuator assembly 10, 11. Thus, the characteristics of each valve actuator assembly 10, 11 are calibrated into valve the positioning verification process.

Burner control system 12 can be used, for example, to regulate the air-to-fuel ratio of fuel to be burned in burner 28 to achieve a flame having a particular temperature or a flame with reduced pollutant emissions. Flow controllers 32, 34 include sensors (not shown) that cooperate with valve actuator assemblies 10, 11 to compensate automatically for variations in physical qualities of the air and fuel, such as fluctuations in pressure and/or temperature to provide a desired mass flow rate of air and fuel to burner 28. It is understood that flow controllers 32, 34 can be provided with other sensors to allow for compensation for other factors, such as humidity or other physical qualities of the air or fuel.

Flow controllers 32, 34 receive a command from an external process controller (not shown) to regulate air and fuel flows so that burner 28 receives an air-fuel mixture of a desired ratio to produce a desired burner output. Flow controllers 32, 34 continuously monitor variations in the mass flow rate of air and fuel flows and send valve position commands to valve actuator assemblies 10, 11 to achieve the desired burner output. Valve actuator assemblies 10, 11 in turn continuously monitor and respond to the actual flow-control valve positions to regulate valve assemblies 13, 14 to achieve the desired flow-control valve positions. Thus, for example, if back pressure from a burner combustion chamber 46 changes either of the valve positions, valve actuator assemblies 10, 11 will recognize the changed valve position, and compensate automatically by changing the valve position back to the desired valve position to achieve the position commanded by flow controllers 32, 34 and maintain the desired air-to-fuel ratio to burner 28.

A result of burner control system 12 is production of a flame 48 from burner 28 having desired characteristics, such as a particular temperature or pollutant emissions, based on input flow rates of air and fuel. Burner 28 includes an air and fuel input manifold 42 into which air and fuel flows enter to create an air-fuel mixture of the desired ratio. Burner 28 is coupled to a mounting surface 40 of combustion chamber 46 and includes a nozzle 44 that directs flame 48 into combustion chamber 46. It is understood that the present invention contemplates any type of burner 28 as needed to produce the desired burner output characteristics.

Air/fuel supply system 21 of burner system 17 includes an air supply 24 that provides an air flow 25 and a fuel supply 26 that provides a fuel flow 27 to produce an air/fuel mixture for use by burner 28 to generate flame 48. Air/fuel supply system 21 further includes an air pipe 20 coupled to burner input manifold 42 and air supply 24 to carry air flow 25 therebetween. Air valve assembly 14 is coupled to air pipe 20 to regulate air flow therein by controlling the position of a butterfly flow-control valve member 18 included in each valve assembly 13, 14. Air-flow controller 32 is coupled to air pipe 20 between air supply 24 and air valve assembly 14 to measure mass flow rate of air flow 25 therebetween and to send valve position commands for flow-control valve member 18 to valve actuator assembly 10.

Air/fuel supply system 21 further includes a fuel pipe 22 coupled to burner input manifold 42 and fuel supply 26 to carry fuel flow 27 therebetween. Fuel valve assembly 13 is coupled to fuel pipe 22 to regulate fuel flow therein. Fuel flow controller 34 is coupled to fuel pipe 22 between fuel supply 26 and fuel valve assembly 13 to measure mass flow rate of fuel flow 27 therebetween and to send valve position commands for flow-control valve member 18 to valve actuator assembly 11.

Burner control system 12 and valve actuator assemblies 10, 11 are suitable for use with industrial burners that use fluid supplies, i.e., liquid and/or gas, such as air and fuel supplies 24, 26 used by burner 28 as shown in FIG. 1. Valve actuator assemblies 10, 11 can be coupled to valve assemblies 13, 14 for regulating any fluid type, such as oxygen, natural gas, liquid propane, and the like.

Flow controllers 32, 34 cooperate with valve actuator assemblies 10, 11 and valve assemblies 13, 14 to regulate air and fuel flows 25, 27 to burner 28 while compensating for environmental variations and fluctuations in air and fuel supplies 24, 26. Flow controllers 32, 34 monitor and respond to fluctuations in measured air and fuel mass flow rates to command a desired valve position to achieve a desired mass flow rate of air and fuel flows 25,27. Valve actuator assemblies 10, 11 move flow-control valve members 18 to the desired valve position and monitor and respond to changes in the measured valve position in valve assemblies 13,14 to maintain flow-control valve members 18 in the desired valve position. Burner control system 12 can thus compensate automatically for undesired changes in the valve position caused by variable environmental conditions or other factors to achieve a desired burner output.

Burner control system 12 further includes an electronic communication network 30 for sending and receiving information between devices within control system 12. Burner control system 12 further includes a control panel 36 and a communication network gateway 38 as shown diagrammatically in FIG. 1. Valve actuator assemblies 10, 11, flow controllers 32, 34, control panel 36, and gateway 38 are all coupled to communication network 30. Gateway 38 allows devices within burner control system 12 to communicate over network 30 with remote systems, such as computers connected to the Internet. This provides system users with an ability to control and monitor control system components such as valve actuator assemblies 10, 11 remotely. Details of flow controllers 32, 34 and communication network 30 of the present invention are described, for example, in co-pending U.S. patent application Ser. No. 08/966,280, entitled INTELLIGENT BURNER CONTROL SYSTEM, the disclosure of which is hereby expressly incorporated by reference into the present application.

Figure 4:
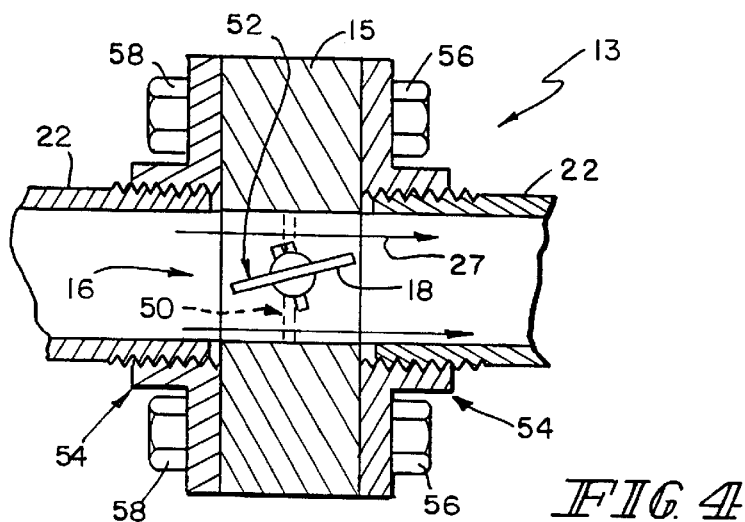
FIG. 4 is a sectional view of a valve assembly taken along line 4—4 of FIG. 1 showing the valve housing, the fluid passageway formed in the valve housing, and the flow-control valve member positioned within the fluid passageway to regulate fluid flow therein.
Figure 2:
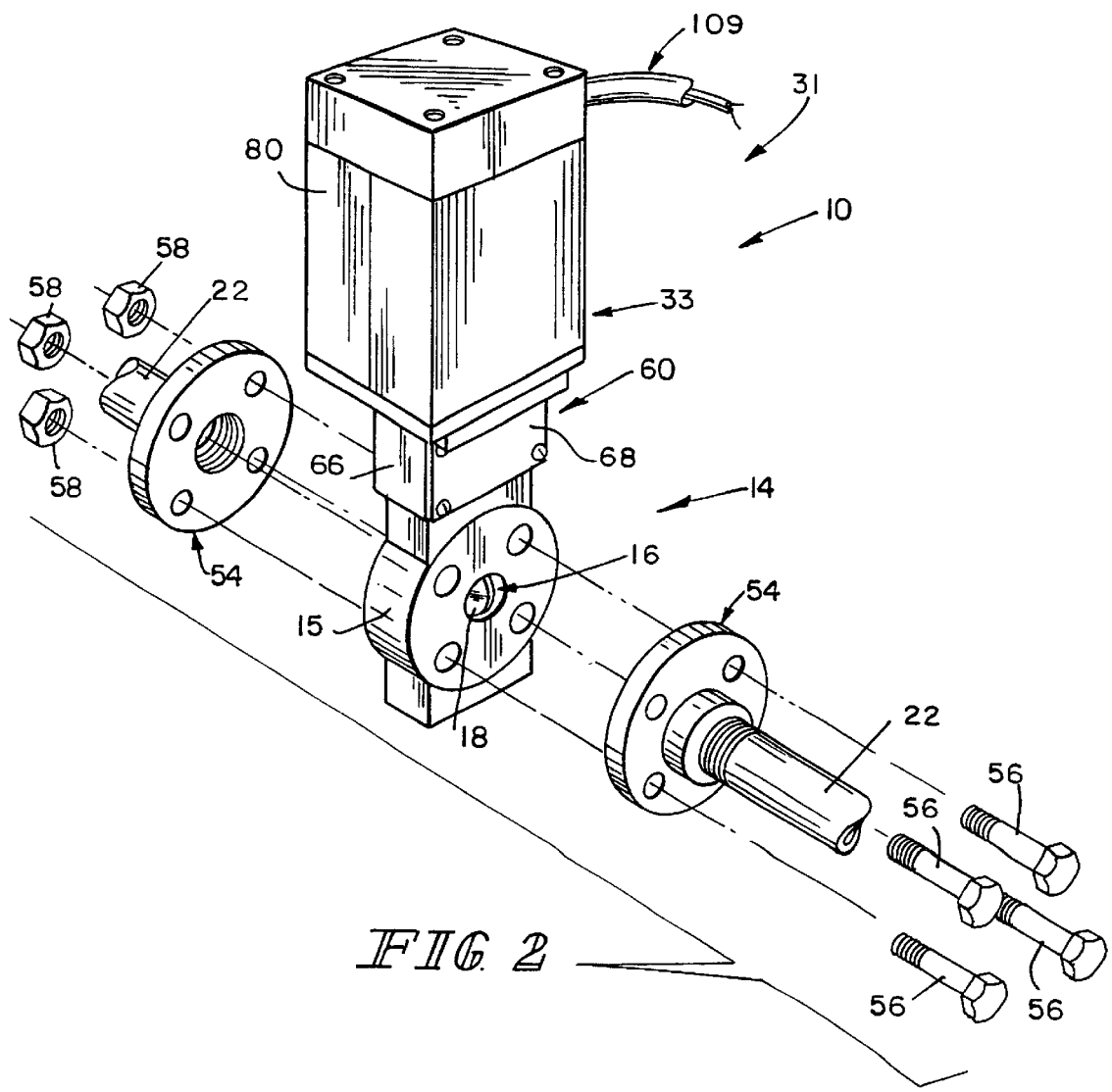
FIG. 2 is a partially exploded perspective view of one of the flow control valves showing the valve assembly including a valve housing aligned for coupling to input and output fuel pipes and a flow-control valve member positioned to lie in a fluid passageway formed in the valve housing and the valve actuator assembly coupled to the valve assembly to control the position of the flow-control valve member and regulate the flow of fluid through the fuel pipes.

Valve assemblies 13, 14 can be interchangeable and each includes a disc-shaped valve housing 15 configured to be coupled to respective air and fuel pipes 20, 22 as best shown in FIG. 2. Fluid passageway 16 extends through valve housing 15 and butterfly flow-control valve member 18 moves from a 0° or fully closed position 50 (dashed lines) to an 85° or frilly opened position 52 (solid lines). Valve actuator assembly 10 controls flow of air and fuel to burner 28 by regulating the position of flow-control valve member 18 within fluid passageway 16 of valve assembly 13, 14 as shown in FIG. 4. It is understood that valve actuator assembly 10 can be adapted to control any other type of valve, such as other rotary valves, e.g., a ball valve.

Pipes 20, 22 include flanged fittings 54 configured to engage valve housing 15 and are attached thereto with bolts 56 and nuts 58 and using appropriate gaskets (not shown) to ensure a leak-proof seal. It is understood that any suitable mechanism for coupling pipes 20, 22 to valve assemblies 13, 14 with an appropriate fluid-tight seal is contemplated for use in connection with system 12. Valve assemblies 13, 14 thus provide a mechanism for regulating flow of air and fuel from air and fuel supplies 24, 26 to burner 28 to achieve an air-fuel mixture having a desired ratio.

Figures 5, 6:
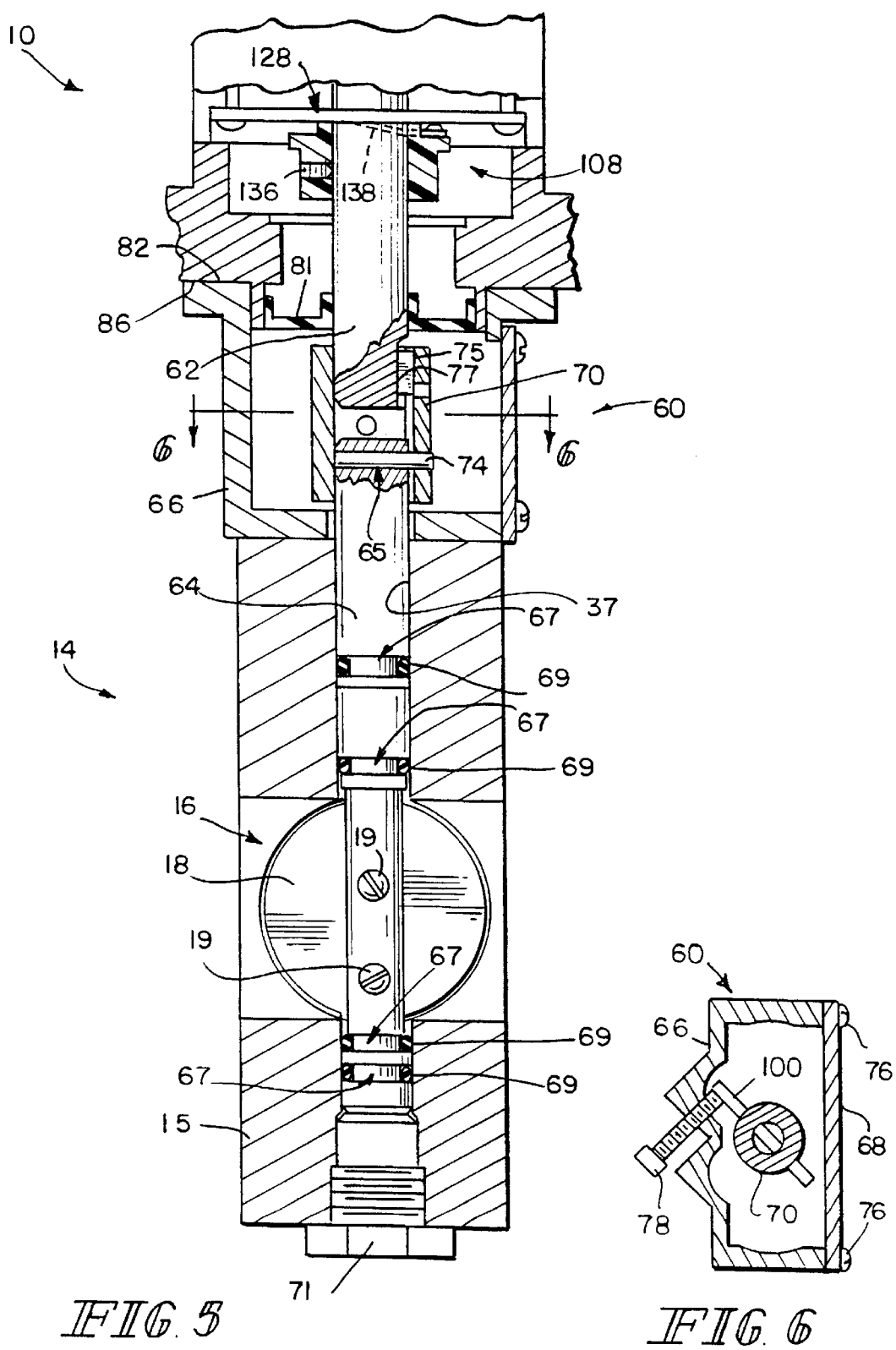
FIG. 5 is a sectional view of one of the valve actuator assemblies coupled to a respective valve assembly taken along line 5—5 of FIG. 1 showing the valve actuator assembly including a position encoder coupled to the actuator output shaft, the cylindrical connector coupled to the actuator output shaft and to the valve shaft to provide for conjoint rotational movement therebetween, and the flow-control valve member coupled to the valve shaft.
FIG. 6 is a sectional view of the coupling taken along line 6—6 of FIGS. 1 and 5 showing the coupling housing, the access panel coupled to the coupling housing, the cylindrical connector within the coupling housing, an actuator stop pin extending through the cylindrical connector, and an adjustable stop coupled to the coupling housing and extending to engage the stop pin and limit the counterclockwise rotation of the flow-control valve member.

Valve actuator assembly 10 includes a valve actuator 33 and an actuator-to-valve coupling 60 for connecting valve actuator 33 to valve assembly 14. Valve actuator 33 includes an actuator output shaft 62 and valve assembly 14 includes a valve shaft 64 as best shown in FIGS. 3 and 5. Actuator-to-valve coupling 60 includes a cylindrical connector 70 used to rigidly connect valve shaft 64 to actuator output shaft 62 for conjoint rotation therewith. Actuator-to-valve coupling 60 includes a housing 66, an access panel 68, cylindrical connector 70, an actuator-shaft key 72, and a valve-shaft locking pin 74. Actuator output shaft 64 includes a pair of flat surfaces 75, 77 each configured to engage key 72. Connector 70 is formed to include a central passageway 79 configured to receive actuator output shaft 62 and valve shaft 64. Connector 70 is further formed to include a notch 73 configured to receive key 72 when actuator output shaft 62 is positioned to lie in passageway 79.

Connector 70, key 72, and locking pin 74 rigidly connect actuator output shaft 62 and valve shaft 64 so that axial rotation of actuator output shaft 62 causes a corresponding axial rotation of valve shaft 64, thereby allowing valve actuator 10 to regulate the position of flow-control valve member 18 within fluid passageway 16.

Actuator-to-valve coupling 60 further includes an adjustable stop 78 configured to prevent rotation of valve shaft 64 in one direction when flow-control valve member 18 is in the 0° or fully closed position. If flow-control valve member 18 is in the fully closed position 50 as shown by dashed lines in FIG. 4, then adjustable stop 78 is positioned to engage an actuator stop pin 100 as shown in FIG. 6.

Stop pin 100 and adjustable stop 78 provide a mechanism for orienting actuator output shaft 62 with respect to valve shaft 84. Providing an adjustable stop 78 provides for adjustment in the field to accommodate mechanical tolerances between components. It is understood that the use of a threaded screw configured to engage actuator stop pin 100 for adjustable stop 78 is illustrative, and that other rotation-blocking mechanisms are contemplated for providing a physical restraint against rotation in one direction when flow-control valve member 18 is in the 0° position, for example varying the shape of connector 70 or housing 66, providing an adjustable configuration of stop pin 100 or locking pin 74, providing a separate stop component, providing an adjustable stop within the valve actuator or valve assembly, providing a non-adjustable stop within the valve assembly that is calibrated at the time of manufacture, etc.

Actuator shaft stop pin 100 is further configured to engage access panel 68 if flow-control valve member 18 exceeds about 85° of travel. Actuator shaft stop pin 100 thus limits flow-control valve member 18 to its appropriate quadrant of operation.

Valve assembly 14 includes a bore 37 in housing 15 through which valve shaft 64 extends into passageway 16. Valve shaft 64 is formed to include a plurality of grooves 67, illustratively two on either side of flow-control valve member 18, that each receive an O-ring 69 as shown in FIG. 5 to seal valve shaft 64 with housing 15 so that passageway 16 is fluid-tight. Flow-control valve member 18 is coupled to valve shaft 64 by a pair of screws 19. Thus, actuator output shaft 62 is connected to flow-control valve member 18 through connector 70 and valve shaft 64. Housing 15 further includes an end plug 71 to provide access to a distal end of valve shaft 64.

Valve actuator 33 can readily be connected or disconnected from valve assembly 14 as best shown in FIG. 3 to facilitate its installation, replacement, or repair. Valve actuator 33 includes a housing 80 having a face 82 with four threaded coupling holes 84. Valve actuator 33 further includes a gasket 81 that seals actuator output shaft 62 to housing 80 adjacent its distal end. Holes 84 can be arranged in standoffs from face 82 as shown in FIG. 3 to facilitate alignment with actuator-to-valve housing during installation.

Actuator-to-valve coupling housing 66 includes an actuator-mating face 86 with a pair of opposed flanges 88 formed to include four holes 90 configured to align with corresponding coupling holes 84 in valve actuator housing 80. Four screws 92 are then used to couple actuator-to-valve coupling housing 66 to actuator housing 80. Alignment can also be facilitated in other ways, such as by one or more alignment bushings (not shown) coupled in aligned openings in faces 82, 86.

Valve actuator 33 is connected to flow-control valve member 18 through connector 70, key 72, valve-shaft locking pin 74, and valve shaft 64 as discussed above. Before removing screws 92 from actuator housing 80, actuator output shaft 62 is disconnected from valve shaft 64 by removing actuator stop pin 100 and valve-shaft locking pin 74 from connector 70. Then, after removal of screws 92, valve actuator 33 can be uncoupled axially from actuator-to-valve coupling 60. This connecting mechanism simplifies installation, replacement, and repair of valve actuator 33, actuator-to-valve coupling 60, and valve assembly 14.

Valve shaft 64 includes a locking-pin aperture 65 and actuator output shaft 62 includes flat surfaces 75, 77. Connector 70 includes notch 73, an actuator-shaft stop pin aperture 96 and a valve-shaft locking-pin aperture 98. When actuator output shaft 62 and valve shaft 64 are positioned within central passageway 79 of connector 70 and actuator-shaft key 72 is inserted notch 73, locking-pin apertures 65, 98 are aligned so that valve-shaft locking pin 74 can be inserted therethrough to rigidly connect valve shaft 64 with actuator output shaft 62 for conjoint rotational movement. Stop pin 100 can then be inserted through aperture 96 and adjustable stop 78 adjusted to configure valve actuator assembly 10 and valve assembly 14 for operation.

Figure 7:
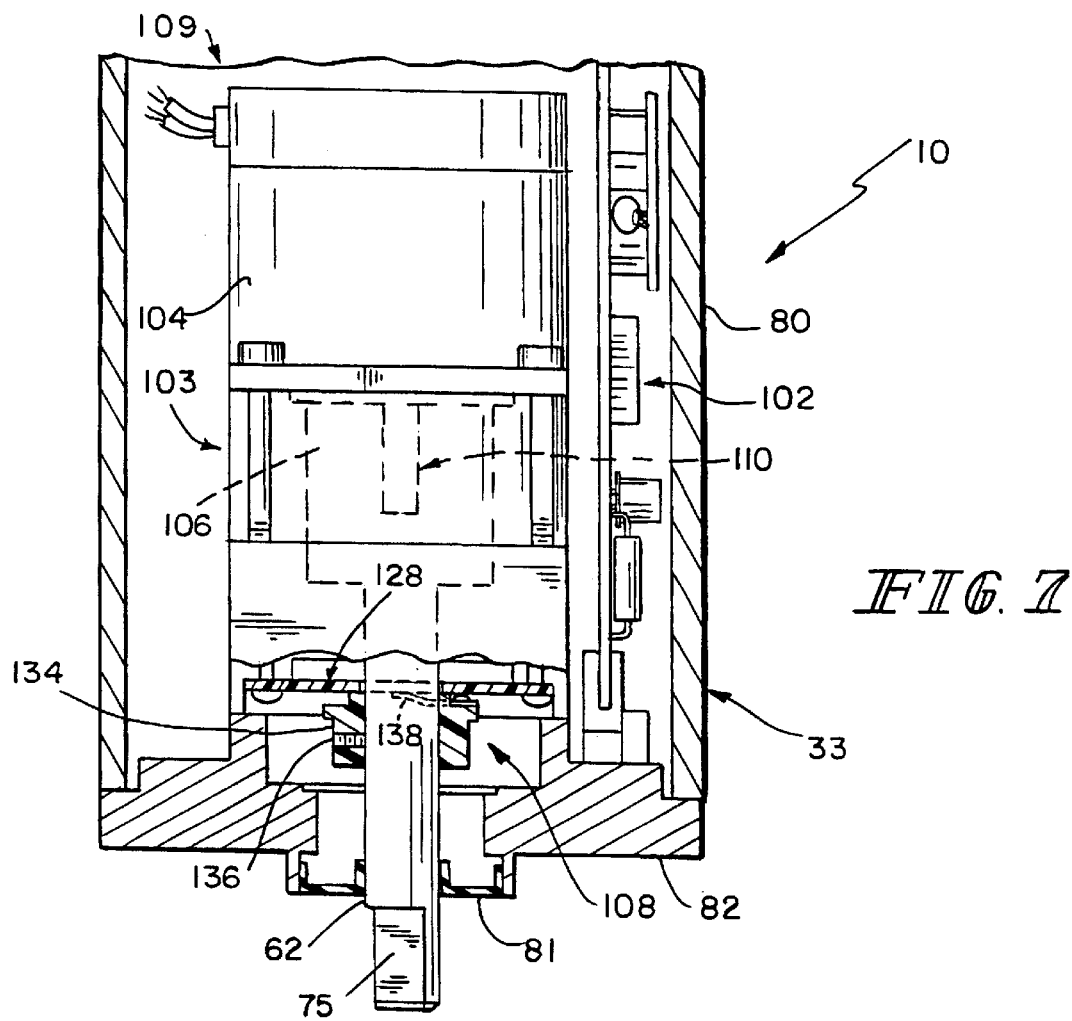
FIG. 7 is a partial sectional view of one of the valve actuators taken along line 7—7 of FIG. 1 showing the valve actuator including the actuator housing, a stepping motor positioned to lie within the actuator housing and including a motor shaft (in phantom), a control module positioned to lie between the stepping mother and the right side of the actuator housing, a planetary gear assembly (in phantom) coupled to the motor shaft, the actuator output shaft coupled to the planetary gear assembly, and the position encoder coupled to the actuator output shaft.

Valve actuator 33 includes a housing 80, a controller 102 including a control module 112 and a position encoder 108 coupled to control module 112, a driver 103 including a stepping motor 104 and a planetary gear reduction assembly 106 (in phantom), and an external interface 109, all contained within actuator housing 80 as best shown in FIG. 7. Actuator housing 80 contains all of the motor drive, communications, and control electronics within the same package as the motor, gear assembly and position encoder. Stepping motor 104 includes a motor output shaft 110 (in phantom) connected to actuator output shaft 62 through planetary gear assembly 106. To achieve precise position control, valve actuator 33 performs closed loop control by commanding flow-control valve member 18 to a desired valve position with motor 104, reading valve position feedback signals generated by position encoder 108, comparing the valve position feedback signal with calibration parameters stored in control module 112, and repositioning flow-control valve member 18 to the desired valve position if it is determined that flow-control valve member 18 is not in the desired valve position.

Controller 102 receives valve position commands over network 30 from flow-controllers 32, 34. The valve position commands can be sent to controller 102 by any compatible device coupled to network 30, and the function of flow-controllers 32, 34 could be combined with controller 102 so that an external process controller (not shown) can send flow regulation commands directly to controller 102 instead of to flow-controllers 32, 34.

Figure 9:
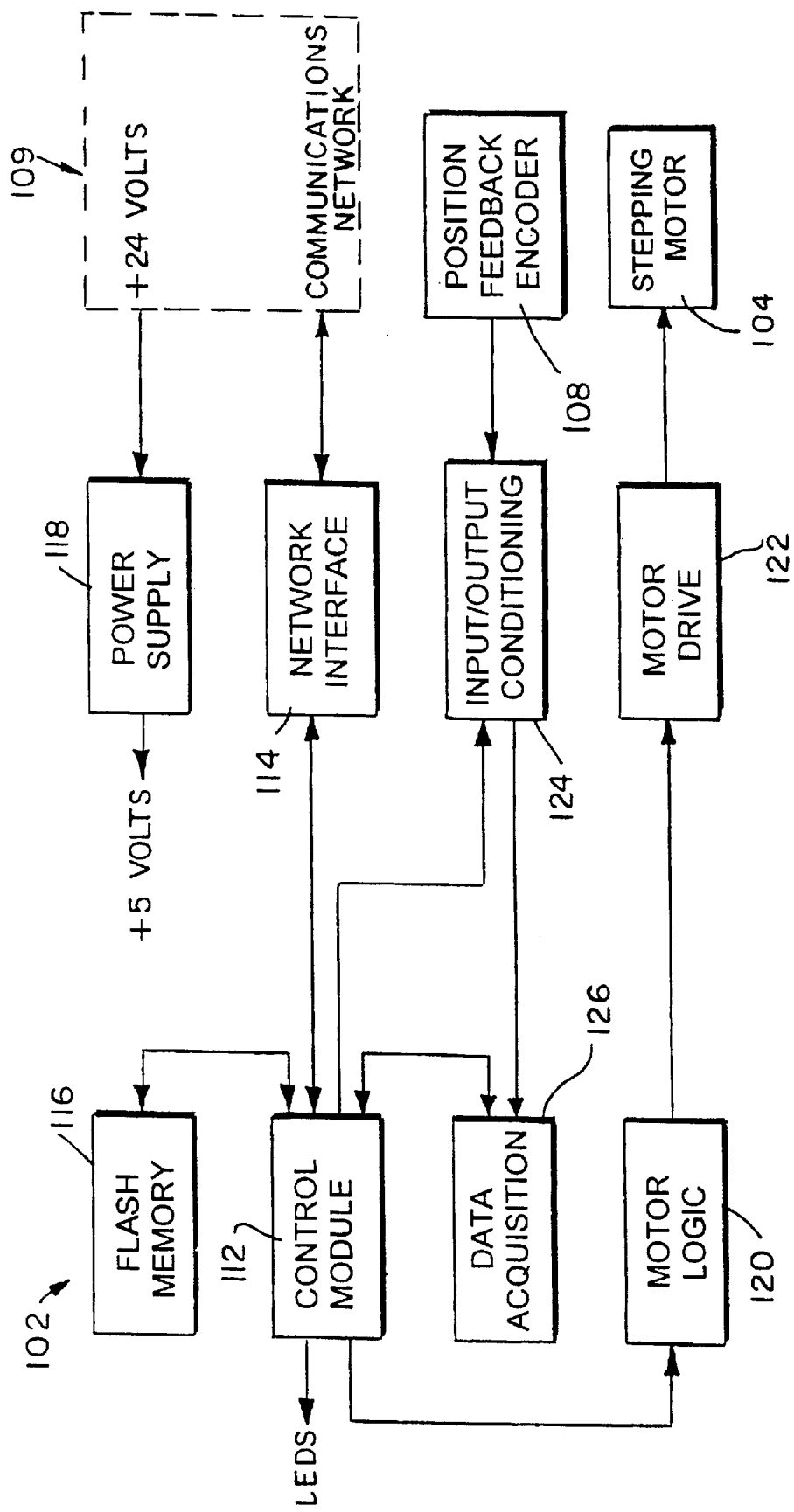
FIG. 9 is a schematic block diagram of one of the valve actuators according to the present disclosure showing the valve actuator including a control module, a network interface, a memory, stepping motor drive electronics, and the position encoder, and the valve actuator configured for performing closed loop control of one of the valve assemblies by commanding the stepping motor connected to the valve assembly and evaluating a valve position signal from the position encoder.

Controller 102 is illustratively is based on Echelon LONworks™ hardware and includes control module 112, position encoder 108, a network interface 114, and a non-volatile flash memory 116 as shown in FIG. 9. Valve actuator 33 is coupled to an external power supply 118 and communication network 30 by external interface 109. Communication network 30 is illustratively a peer-to-peer communication network, but it is understood that any suitable protocol can be used. Control module 112 also includes embedded software stored in flash memory 116 to aid in operating valve actuator 33 as a closed loop system. Although valve actuator 33 uses a LONworks™-based control module for digital communication between valve actuator 33 and a process controller, e.g., flow controllers 32, 34, over communication network 30, other serial protocols (e.g., FieldBus) or analog signaling (e.g., 4–20 ma) could be used to command valve actuator 33.

Controller 102 also includes motor logic 120, motor drive electronics 122, input/output circuitry 124, and data acquisition circuitry 126. External interface 109 is where the external wiring is terminated. There are illustratively four wires: two for power and two for communications. A 24 VDC input power supply is illustrated, but other voltage sources could be used with optional power conditioning electronics. Likewise, although the LONworks™ peer-to-peer communication protocol (LONTalk™) is used, any suitable protocol could be used.

Stepping motor 104 is a standard, commercially available Size 23 permanent magnet DC stepper and is driven in a full bridge pulse-width-modulated configuration by motor logic 120 and motor drive 122. The step size is illustratively 1.8°. A standard motor is capable of producing approximately 0.35 N-m (50 oz-in) of torque at nominal design conditions. Motor 104 can illustratively drive a load of approximately 0.70 N-m (100 inch-pounds) over a 90° span on the actuator output shaft 62 in less than 4 seconds, although higher torque motors can be specified for the same Size 23 footprint. Motor shaft 10 can be configured and hardened as required and to mate up with and drive the planetary gear assembly 106.

The relationship between the valve position command from controller 102 to stepping motor 104 and the desired valve position of flow-control valve member 18 is stored in flash memory 116. The relationship can be linear over the full range of valve motion or can be an application specific function, such as non-linear gain under predicted or measured fluid flow operating conditions. For example, the system can be programmed to modify the relationship based on changes in operating pressures and temperatures within valve assembly 14. Flash memory 116 further allows for reprogramming in the field to allow for modification for different operating conditions.

Controller 102 and planetary gear assembly 106 provide for precise control of rotary output commands from motor 104. Position encoder 108 is coupled directly to actuator output shaft 62 to provide for high-accuracy valve position feedback signals to control module 112 to achieve high precision, closed loop control of flow-control valve member 18.

Planetary gear assembly 106 is coupled between an input at motor 104 (low torque side) and valve assembly 14 actuation output (high torque side). By using DC stepping motor 104 and planetary gear assembly 106, valve actuator 33 provides for a very high torque to size ratio. A 0.05° resolution is achieved using the 1.8° motor step size divided by a 40:1 gear reduction ratio in planetary gear assembly 106. Closed loop position control to within an absolute position of two steps thus provides a rotational precision of about 0.1°. It is understood that the desired precision can be achieved by other means, such as a sufficiently precise motor or by use of other gear reduction assemblies.

The calibration parameters used to verify the actual position of flow-control valve member 18 correspond to the absolute position of actuator output shaft 62. Because actuator output shaft 62 is rigidly connected to valve shaft 74 and flow-control valve member 18, the calibration parameters also correspond to the absolute position of flow-control valve member 18. The calibration parameters are derived during a calibration setup procedure wherein control module 112 instructs stepping motor 104 to incrementally step actuator output shaft 62 through each of the 0.05° steps. Position encoder 108 generates a valve position signal for each respective step and control module 112 generates calibration parameters based on the valve position signals received from position encoder 108. The calibrations parameters can be generated either at the time of manufacture or at any subsequent time.

The closed loop control is based on calibration parameters derived from the actual valve position signal generated by position encoder 108. This basis ensures that actuator 33 accounts for variations between actual and desired valve positions for each specific position encoder 108 and driver 103. Flash memory 116 further allows for reprogramming in the field to allow for new calibration parameters or modification of the calibration parameters for different operating conditions. Valve actuator 33 thus provides an actuation system that provides for highly precise control of valve position while compensating for variations in mechanical operation such as mechanical backlash of gearing in the motor or characteristics of the specific position encoder 108.

Figure 8:
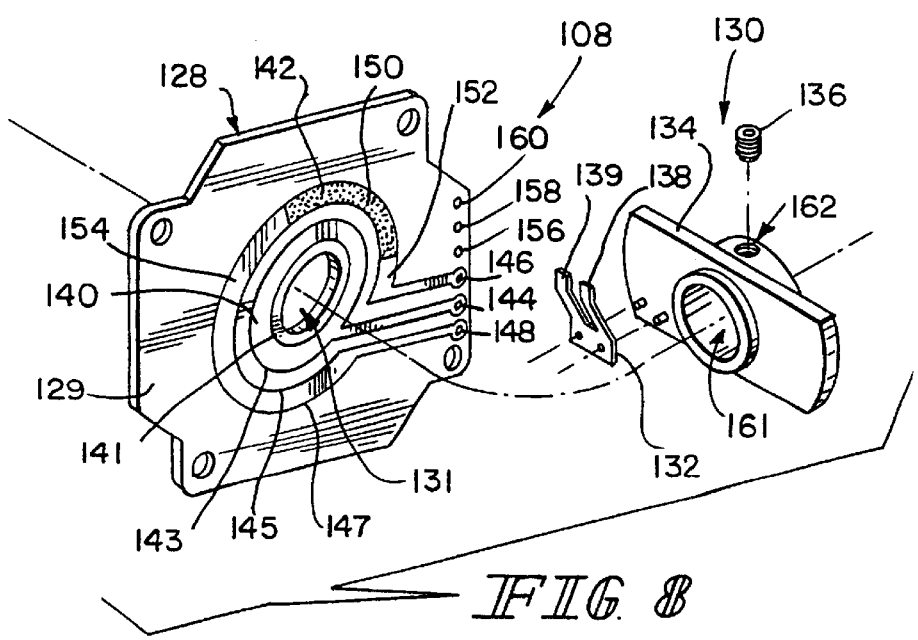
FIG. 8 is an exploded perspective view of the position encoder of FIG. 7 showing the position encoder including a stationary plate having concentric annular contacts and a rotor having a wiper hub, a wiper having two fingers, and a screw for coupling the wiper hub to the actuator output shaft.

Position encoder 108 is a rotary motion sensor that generates an absolute valve position signal indicative of the valve position of flow-control valve member 18. Position encoder 108 includes a stationary conductive plastic resistive element 128 and a rotor 130 as best shown in FIG. 8. Conductive plastic element 128 provides a high level of output smoothness and long life (associated element and wiper wear). Rotor 130 includes a conductive wiper 132, wiper hub 134, and threaded pins or set screws 136. Conductive wiper 132 includes inner and outer fingers 138, 139 and is rigidly connected to actuator output shaft 62 by wiper hub 134 and threaded pins or set screws 136. By coupling position encoder 108 rigidly and directly to actuator output shaft 62, it thus directly measures the position of actuator output shaft 62 after any hysteresis that might result from motor 104 and planetary gear assembly 106. Furthermore, integration of position encoder 108 directly with actuator output shaft 62 eliminates any need for additional gearing required for position feedback as required in valve position feedback designs not coupled rigidly and directly to actuator output shaft 62.

Resistive element 128 includes an insulative back plate 129, an annular inner contact 140, and a spaced-apart annular outer contact 142 as shown in FIG. 8.

Back plate 129 is formed with an aperture 131 to accommodate actuator output shaft 62. Annular inner contact 140 is defined by inner and outer edges 141, 143, and outer contact 142 is defined by inner and outer edges 145, 147. Annular contacts 140, 142 are concentric and illustratively made from 0.062 inch thick epoxy fiberglass.

Outer contact 142 includes a curved active sensor travel region 150, first and second plated terminals 146, 148, and first and second plated portions 152, 154 coupled between terminals 146, 148 and active sensor travel region 150. Active sensor travel region 150 extends for about 100° to provide a variable resistor having a resistive epoxy fiberglass surface that encompasses the range corresponding to flow-control valve member position range of −5° to +95°, that is, incorporating the range of valve operation from 0° to 85°.

Inner contact 140 illustratively includes a 0.00005 inch gold plating over a 0.0001 inch thick copper cladding on all 360° of its surface and is coupled to a plated terminal 144 outside outer contact 142 as best shown in FIG. 8. Plated terminals 144, 146, 148 and plated portions 152, 154 include the same gold plating and copper cladding as inner contact 140. Plated terminals 144, 146, 148 are coupled to external wiring terminals 156, 158, 160 to provide for strain relief in coupling external wiring (not shown) to position encoder 108.

Wiper hub 134 includes an axial shaft-receiving aperture 161 configured to receive actuator output shaft 62 and two radially inwardly extending threaded holes 162 arranged 90° apart and configured to align with two corresponding threaded holes (not shown) in actuator output shaft 62 such that alignment of hub 134 with shaft 62 places rotor 130 in the 0° position when flow-control valve member 18 is in the 0° or fully closed position. Hub 134 is illustratively made from anodized aluminum, although any suitable material can be used. Hub 134 is coupled to actuator output shaft 62 by a hub locking pin (not shown) that extends through hub 134 and into shaft 62.

Inner and outer fingers 138, 139 of conductive wiper 132 are spaced apart to match the spacing between annular inner and outer contacts 140, 142 of resistive element 128. Fingers 138, 139 are configured to extend from hub 134 at a shallow angle to make sliding electrical contact without impeding rotation of actuator output shaft 62. Inner finger 138 is configured to align with annular inner contact 140 and outer finger 139 is configured to align with annular outer contact 142. As output shaft 62 and rotor 130 rotate conjointly over the range of motion for flow-control valve member 18, outer finger 139 engages active sensor travel portion 150 and the resistance between terminals 144 and 146 will vary as a function of the angular position of actuator output shaft 62.

Figure 10:
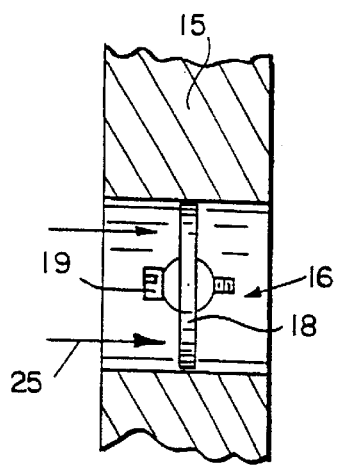
FIGS. 10–15 are sequential views of the plate valve positioned in the fluid passageway formed in the valve housing and the wiper and stationary plate of the position encoder showing rotation of the wiper relative to the stationary plate during rotation of the flow-control valve member by the stepping motor.
Figure 11:
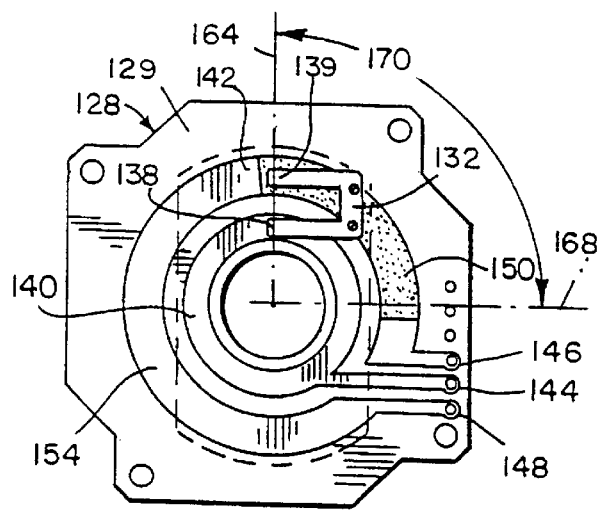
Figure 12:
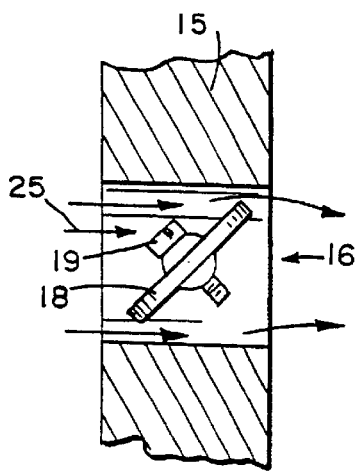
Figure 13:
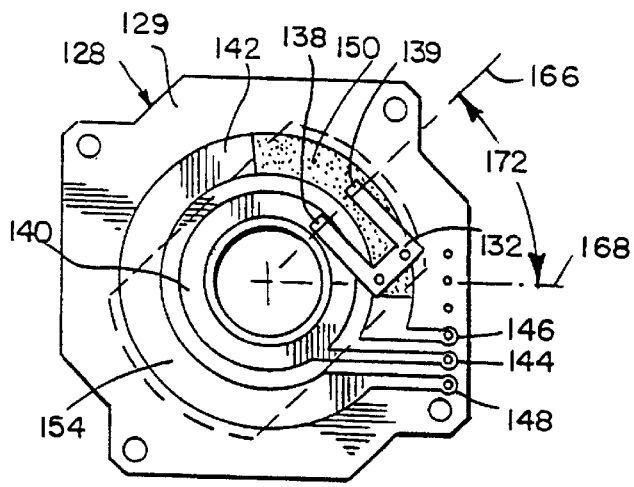
Figure 14:
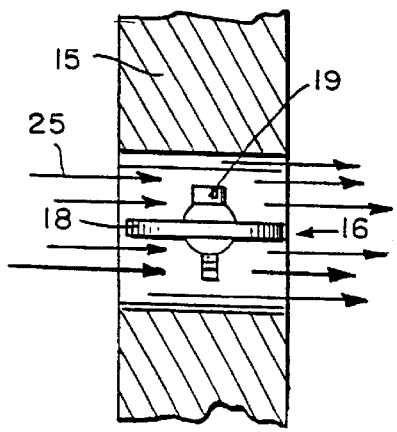
Figure 15:
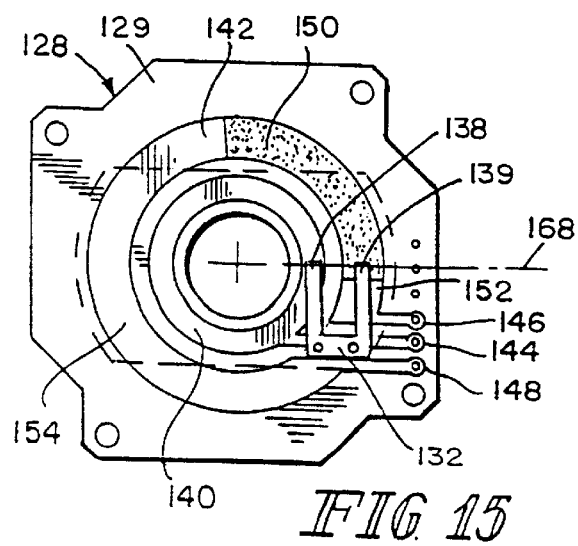

The relationship between rotor 130 and resistive element 128 for position encoder 108 and the corresponding valve position of flow-control valve member 18 in passageway 16 for valve assembly 14 is best shown in FIGS. 10–15. Rotor 130 has an operational range of about 90° from a 0° or fully closed position 164 to a 90° or fully opened position 168 as shown by arrow 170. FIG. 11 shows wiper 132 positioned over resistive element 128 at the fully closed position 164 corresponding to a fully closed position of flow-control valve member 18 as shown in FIG. 10. FIG. 13 shows wiper 132 positioned about midway over the active area of resistive element 128 at a valve partially opened position 166, or about 45° from fully opened as shown by arrow 172, corresponding to a partially opened position of flow-control valve member 18 as shown in FIG. 12. FIG. 15 shows wiper 132 positioned over resistive element 128 at the fully opened position 168 corresponding to the fully opened position of flow-control valve member 18 as shown in FIG. 14.

The value of the resistance between terminals 144 and 146 from position encoder 108 is included as one arm in a bridge circuit (not shown) in input/output circuit 124 to provide a valve position signal indicative of the actual position of actuator output shaft 62. During calibration setup, signals are provided to control module 112 to derive the calibration parameters. During operation, another valve position signal is generated for comparison to the calibration parameters to determine the actual valve position and, if necessary, reposition flow-control valve member 18 to the desired valve position. As discussed above, actuator output shaft 62 is aligned and rigidly connected to valve shaft 64 so that actuator output shaft 62 position corresponds directly to the position of valve shaft 64 and flow-control valve member 18.

The calibration parameters for position encoder 108 can be setup at the time of manufacture or any subsequent period. For example, controller 102 can receive a command to calibrate over communication network 30. Calibration is automatically performed using the following process. As discussed above, there is a mechanical stop 78 at the fully closed or 0° position of flow-control valve member 18, and the operating range of flow-control valve member 18 extends through 85° or 90°. The reference calibration parameters are setup by commanding stepping motor 104 to sequence actuator output shaft 62 from the 0° position as indicated by the physical stop in 0.05° increments through the range of incremental valve positions.

The effective resistance output measured from wiper contact fingers 138, 139 and resistive element 128 (measured as a voltage in a voltage divider network) provide a valve position signal indicative of the valve position for each valve step that is recorded in a calibration table in flash memory 116 for each incremental step (position vs. resistance) to provide reference calibration parameters specific to position encoder 108. Any non-linearities such as manufacturing tolerances in active sensor travel region 150 are thus calibrated out because the non-linearities are "built" into the calibration parameters.

Software within controller 102 determines that valve actuator 33 is properly calibrated if the resistance value at the 0° physical stop is within an acceptable range, if the full range of motion is achieved, and if any non-linearities in the measured resistance values are within suitable limits. Valve actuator 33 thus provides a system for automatic calibration or recalibration without the need for external equipment.

For a position encoder 108 having a linear valve position signal characteristic over the operating range of flow-control valve member 18, only beginning and end valve position signals for the range of travel are stored so that intermediate valve calibration parameters can subsequently be calculated by interpolation of the beginning and end valve positions signals. In this approach, controller 102 can also analyze all intermediate valve position signals taken throughout the operating range of flow-control valve member 18 during calibration to ensure position encoder 108 exhibits proper linear characteristics. Controller 102 can reject position encoders that do not exhibit linear characteristics within a predefined tolerance level.

Controller 102 can further analyze intermediate valve position signals to determine a non-linear characteristic curve for the position signal output of position encoder 108 using techniques as are known in the art, for example by using a polynomial curve fit. Controller 108 can then use the characteristic curve for calculating the calibration parameters for use in comparing to the valve position signals generated during operation.

Position encoder 108 provides a precise absolute valve position signal of actuator output shaft 62 for the control loop feedback and comparison with the calibration parameters. In an operational system, control module 112 accepts a rotary position command from an external process controller over communication network 30, e.g., flow controllers 32, 34. Control module 112 generates the appropriate command for motor logic 120 and motor drive 122 to command motor 104 to drive output shaft 62 to the desired valve position. After the move, an absolute valve position signal is generated by position encoder 108, measured and compared to the calibration parameters to determine whether the actual valve position matches or is within a specified tolerance of the desired valve position, and, if necessary, flow-control valve member 18 is repositioned to the desired valve position by further commanding motor 104.

Control module 112 software further contains numerous diagnostic tests to verify that valve actuator 33 is performing as commanded. For example, if the desired valve position cannot be achieved (e.g., excessive load), controller 102 indicates an alarm by sending a signal over communication network 30. Also, if actuator output shaft 62 is at the appropriate position and forced off that position then control module 112 will automatically try to recover by commanding motor 104, and if it cannot recover then an alarm signal is sent over communication network 30.

Controller 102 also has the ability to measure valve actuator variables such as motor current, temperature, torque setting (high and low torque settings could be commanded), shaft and valve positions and feedback, and alarm conditions. Valve actuator variables are transmitted over the network 30 for monitoring, logging, alarm, diagnostic, and control purposes.

Although the invention has been described in detail with reference to certain preferred embodiments, variations and modifications exist within the scope and spirit of the invention as described and defined in the following claims.

What is claimed is:

1. A valve actuator assembly adapted to be connected to a flow-control valve member positioned to lie in a flow path of a fluid supply system, the valve actuator assembly comprising
   a housing,
   a driver coupled to the housing, the driver including a stepping motor, a gear assembly connected to the stepping motor, and a shaft connected to the stepping motor and configured to move a flow-control valve member positioned in a flow path of a fluid supply system from an actual valve position to a desired valve position to regulate the flow of fluid through the flow path, and
   a controller coupled to the stepping motor and configured to command the stepping motor to position the flow-control valve member in the desired valve position, the controller including a control module and a sensor, the control module being programmed to receive a position command and to instruct the stepping motor to move the flow-control valve member to the desired valve position based on the position command, the sensor being coupled to the control module and the shaft to indicate the actual valve position of the flow-control valve member using a valve position signal generated by the sensor and sent from the sensor to the control module, the control module being programmed to receive and compare the valve position signal received from the sensor to calibration parameters to determine whether the valve is in the desired valve position and to instruct the motor to reposition the flow-control valve member in the desired valve position.

2. The valve actuator assembly of claim 1, wherein the sensor includes a rotor coupled to the shaft and a stationary member coupled to the housing.

3. The valve actuator assembly of claim 2, wherein the rotor is formed to include a shaft-receiving aperture and the shaft is positioned to lie in the shaft-receiving aperture.

4. The valve actuator assembly of claim 2, wherein the rotor includes a wiper hub coupled to the shaft and a wiper coupled to the wiper hub and arranged to engage the stationary member.

5. The valve actuator assembly of claim 4, wherein the stationary member includes a first annular contact and a second annular contact spaced apart from the first annular contact and including a resistor, the wiper includes first and second fingers, the first finger is arranged to engage the first annular contact, and the second finger is arranged to engage the resistor of the second annular contact.

6. The valve actuator assembly of claim 2, further comprising a coupling, wherein the coupling connects the shaft to the flow-control valve member and the rotor is positioned to lie between the coupling and the motor.

7. The valve actuator assembly of claim 1, wherein the gear assembly is a planetary gear coupled to the shaft.

8. The valve actuator assembly of claim 7, wherein the planetary gear is positioned to lie between the sensor and the motor.

9. The valve actuator assembly of claim 1, wherein the shaft is rigidly connected to the flow-control valve member for conjoint rotation therewith and the sensor is rigidly coupled to the shaft for conjoint rotation therewith.

10. A valve actuator assembly adapted to be coupled to a flow-control valve member positioned to lie in a flow path of a fluid supply system, the valve actuator assembly comprising
    a housing,
    a driver coupled to the housing and configured to move a flow-control valve member positioned in a flow path of a fluid supply system from an actual valve position to a desired valve position to regulate the flow of fluid through the flow path, and
    a controller coupled to the driver and configured to command the driver to position the flow-control valve member in the desired valve position, the controller including a control module coupled to the driver and a sensor, the control module being configured to derive and store calibration parameters of the actuator and to instruct the driver to move the flow-control valve member to the desired valve position, the sensor being coupled to the control module and configured to indicate the actual valve position of the flow-control valve member using a valve position signal generated by the sensor and sent from the sensor to the control module, the control module being programmed to compare the actual valve position signal from the sensor to the calibration parameters to determine whether the flow-control valve member is in the desired valve position and to instruct the driver to reposition the flow-control valve member in the desired valve position.

11. A valve actuator assembly adapted to be coupled to a flow-control valve member positioned to lie in a flow path of a fluid supply system, the valve actuator assembly comprising
    a housing,
    a driver coupled to the housing and configured to move a flow-control valve member positioned in a flow path of a fluid supply system from an actual valve position to a desired valve position to regulate the flow of fluid through the flow path, and
    a controller coupled to the driver and configured to command the driver to position the flow-control valve member in the desired valve position, the controller including a control module coupled to the driver and a sensor, the control module being programmed to instruct the driver to move the flow-control valve member to calibration positions, the sensor indicating a valve position signal for each calibration position, the control module being programmed to store calibration parameters derived from the valve position signals, the control module being configured to instruct the driver to move the flow-control valve member to the desired valve position, the sensor being coupled to the control module and configured to indicate the actual valve position of the flow-control valve member using a valve position signal generated by the sensor and sent from the sensor to the control module, the control module being programmed to compare the actual valve position signal from the sensor to the calibration parameters to determine whether the flow-control valve member is in the desired valve position and to instruct the driver to reposition the flow-control valve member in the desired valve position.

12. The actuator of claim 11, wherein the control module is programmed to instruct the driver to move the flow-control valve member between a first calibration position and a second calibration position, the sensor generates a valve position signal while the flow-control valve member is in the first calibration position, the sensor generates a valve position signal while the flow-control valve member is in the second calibration position, and the control module derives new calibration parameters from the signals generated by the sensor while the flow-control valve member are in the first and second calibration positions.

13. The actuator of claim 12, wherein the control module is programmed to instruct the driver to move the flow-control valve member to a closed position blocking the flow of fluid through the flow path while in the first calibration position and the control module is programmed to instruct the drive to move the flow-control valve member to an opened position permitting flow through the flow path while in the second calibration position.

14. The actuator of claim 13, further comprising a stop coupled to the housing and arranged to limit the rotation of the shaft.

15. The actuator of claim 12, wherein the control module is programmed to derive the new calibration parameters using a linear interpolation of the signals generated by the sensor while the flow-control valve member is in the first and second calibration positions.

16. The actuator of claim 11, wherein the driver includes a stepping motor and a shaft connected to the flow-control valve member.

17. The actuator of claim 16, wherein the control module is programmed to instruct the stepping motor to move the flow-control valve member relative the housing through valve calibration positions, the sensor generates a valve position signal while the flow-control valve member is in each of the calibration positions, and the control module derives new calibration parameters from the signals generated by the sensor while the flow-control valve member is in the calibration positions.

18. The actuator of claim 17, wherein the control module is programmed to derive the new calibration parameters using a linear interpolation of the signals generated by the sensor while the flow-control valve member is in the calibration positions.

19. The actuator of claim 17, wherein the control module is programmed to derive the new calibration parameters using a polynomial curve fit of the signals generated by the sensor while the flow-control valve member is in the calibration positions.

20. The actuator of claim 11, wherein the control module is positioned to lie in the housing.

21. A method of calibrating a valve actuator assembly, the method comprising the steps of
providing a valve actuator assembly having a driver connected to a flow-control valve member and a controller coupled to the driver, the controller including a control module coupled to the driver and a sensor coupled to the control module, the control module being configured to command the driver to move the flow-control valve member from an actual valve position to a desired valve position, and the sensor being configured to indicate the actual valve position using a valve position signal indicative of the actual valve position,
generating variable calibration parameters specific to the sensor,
commanding the driver to move the flow-control valve member to the desired valve position,
generating a valve position signal,
comparing the valve position signal with the calibration parameters to determine the need to reposition the flow-control valve member from the actual valve position to the desired valve position, and
commanding the driver to reposition the flow-control valve member to the desired valve position.

22. The method of claim 21, wherein the control module further includes a memory and further comprising the step of storing the calibration parameters in the memory of the controller.

23. The method of claim 22, wherein the step of generating the calibration parameters includes the steps of commanding the driver to move the flow-control valve member to calibration positions, generating valve-calibration position signals while the flow-control valve member is in the calibration positions, deriving the calibration parameters from the valve calibration signals, and storing the calibration parameters in the memory of the control module.

24. The method of claim 23, wherein the step of commanding the driver to move the flow-control valve member to calibration positions includes commanding the driver to move the flow-control valve member to an opened position permitting flow through a flow path and to a closed position blocking flow through the flow path.

25. The method of claim 23, wherein the step of deriving the calibrations parameters includes interpolating the valve-calibration position signals to provide the calibration parameters.

26. The method of claim 23, wherein the step of deriving the calibration parameters includes using a polynomial curve fit to derive the calibration parameters from the valve-calibration position signals.

27. The method of claim 21, further comprising the step of generating new calibration parameters specific to the sensor, wherein the step of generating new calibration parameters includes the steps of commanding the driver to move the flow-control valve member to calibration positions, generating valve-calibration position signals while the flow-control valve member is in the calibration positions, deriving the new calibration parameters from the valve-calibration signals, and storing the new calibration parameters in the control module.

28. A valve actuator assembly adapted to be connected to a flow-control valve member positioned to lie in a flow path of a fluid supply system, the valve actuator assembly comprising
a housing,
a driver coupled to the housing and configured to move a flow-control valve member positioned in a flow path of a fluid supply system from an actual valve position to a desired valve position to regulate the flow of fluid through the flow path, and
a controller coupled to the driver and configured to command the driver to position the flow-control valve member at the desired valve position, the controller including a control module, a network interface coupled to the control module and configured to communicate with a communications network, and a sensor coupled to the control module and configured to indicate the actual valve position of the flow-control valve member using a valve position signal generated by the sensor, the control module being programmed to receive position commands through the network interface from the communications network to instruct the driver to move the flow-control valve member to the desired valve position, to receive and compare the actual valve position signal from the sensor to calibration parameters to determine whether the flow-control valve member is in the desired valve position, and instruct the driver to reposition the flow-control valve member in the desired valve position.

29. The actuator of claim 28, wherein the control module is programmed to receive calibration instructions through the network interface from the communication network and to generate new calibration parameters in response to the calibration instructions.

30. The actuator of claim 28, wherein the control module is programmed to communicate valve actuator assembly data through the network interface to the communications network.

31. The actuator of claim 30, wherein the control module is configured to communicate driver performance data through the network interface to the communications network.

32. The actuator of claim 31, wherein the control module is configured to communicate the failure of the driver to position the flow-control valve member in the desired valve position as indicated by the comparison of the valve position signal and the calibration parameters.

33. The actuator of claim 28, wherein the network interface is configured to communicate with the Internet.

34. A burner system comprising
a burner,
a fluid supply system coupled to the burner, and
a burner control system coupled to the fluid supply system, the burner control system including a valve assembly including a flow-control valve member and a valve actuator assembly coupled to the valve assembly to position the flow-control valve member in a desired valve position, the valve actuator assembly including a position encoder rigidly connected to the flow-control valve member to generate valve position signals indicative of the actual valve position of the flow-control valve member, the valve actuator assembly further including a control module programmed to derive a plurality of calibration parameters specific to the position encoder from valve position signals substantially indicative of the entire range of motion of the flow-control valve member and store the calibration parameters, the control module being configured to command positioning of the flow-control valve member to a desired valve position, the position encoder being configured to send valve position signals to the control module, the control module being configured to compare the valve position signal to the calibration parameters to determine whether the flow-control valve member is in the desired valve position and command repositioning of the flow-control valve member based on the comparison of the valve position signal with the calibration parameters.

* * * * *